(12) United States Patent
Doughty et al.

(10) Patent No.: US 11,054,129 B2
(45) Date of Patent: Jul. 6, 2021

(54) BOILER FILL VALVE WITH REGULATED FAST-FILL

(71) Applicant: Watts Regulator Co., North Andover, MA (US)

(72) Inventors: Jason Doughty, Fitchburg, MA (US); Matthew Fratantonio, Northborough, MA (US); Paul J. Lake, Waltham, MA (US); Frank DiBenedetto, North Andover, MA (US)

(73) Assignee: Watts Water Technologies, North Andover, MA (US)

( * ) Notice: Subject to any disclaimer, the term of this patent is extended or adjusted under 35 U.S.C. 154(b) by 47 days.

(21) Appl. No.: 16/238,166

(22) Filed: Jan. 2, 2019

(65) Prior Publication Data

US 2019/0154252 A1    May 23, 2019

Related U.S. Application Data

(63) Continuation-in-part of application No. 15/401,997, filed on Jan. 9, 2017, now Pat. No. 10,247,327.
(Continued)

(51) Int. Cl.
*F22D 5/18* (2006.01)
*F22D 11/00* (2006.01)
*G05D 16/00* (2006.01)

(52) U.S. Cl.
CPC ............... *F22D 5/18* (2013.01); *F22D 11/00* (2013.01); *G05D 16/00* (2013.01); *Y10T 137/7793* (2015.04); *Y10T 137/7807* (2015.04)

(58) Field of Classification Search
CPC .......... F16K 37/0008; F22D 5/00; F22D 5/18; F22D 11/00; G05D 16/00;
(Continued)

(56) References Cited

U.S. PATENT DOCUMENTS

| | | | | |
|---|---|---|---|---|
| 1,340,790 A | ‡ | 5/1920 | O'Neil | F22B 37/545 137/62 |
| 2,816,812 A | * | 12/1957 | Peck | C23F 11/02 220/87.2 |

(Continued)

OTHER PUBLICATIONS

Watts, Series 1156F, T156B and N256 Feed Water Pressure Regulators, Product Specification Catalog, 2015, 4 pages, U.S.A.‡
(Continued)

*Primary Examiner* — Jessica Cahill
(74) *Attorney, Agent, or Firm* — Day Pitney LLP; George Chaclas; Valeriya Svystun

(57) ABSTRACT

A pressure regulator assembly has a normal mode and a regulated fast-fill mode and includes a spring cage and a body coupled together. The spring cage and body define an inlet in fluid communication with an outlet as well as an interior between the inlet and the outlet. A diaphragm assembly mounts in the interior for selectively closing a flowpath between the inlet and the outlet. A preload spring in the interior applies force on the diaphragm assembly so that in the normal mode, the flowpath is closed if a downstream pressure is above a first pressure. An actuation assembly includes a lever coupled to the spring cage and a push rod mounted so that in the regulated fast-fill mode, the lever slides so that the push rod further compresses the preload spring to open the flowpath and regulate flow therethrough if the downstream pressure is below a second pressure.

12 Claims, 11 Drawing Sheets

Related U.S. Application Data

(60) Provisional application No. 62/276,357, filed on Jan. 8, 2016.

(58) Field of Classification Search
CPC ......... Y10T 137/7793; Y10T 137/7797; Y10T 137/7807; Y10T 137/7831; Y10T 137/8158; Y10T 137/8225; Y10T 137/8275; Y10T 137/8292; Y10T 137/8309
See application file for complete search history.

(56) References Cited

U.S. PATENT DOCUMENTS

| | | | | |
|---|---|---|---|---|
| 2,842,151 | A ‡ | 7/1958 | Cunningham, Jr. | F01D 21/14 122/43 |
| 2,981,280 | A * | 4/1961 | Cornelius | G05D 16/0663 137/505.26 |
| 3,205,670 | A * | 9/1965 | Carolan | F17C 9/02 62/50.4 |
| 3,610,276 | A * | 10/1971 | Seelman | F16K 17/0433 137/469 |
| 3,665,956 | A * | 5/1972 | Hammon | G05D 16/0663 137/505.11 |
| 3,682,438 | A * | 8/1972 | Klimek | F16K 31/52408 251/256 |
| 3,693,652 | A * | 9/1972 | Iung | F16K 17/30 137/557 |
| 3,812,877 | A | 5/1974 | Fleischhacker et al. | |
| 3,955,647 | A ‡ | 5/1976 | Tine | F01M 1/08 184/39.1 |
| 4,000,752 | A ‡ | 1/1977 | Miller | F16K 31/143 137/118.05 |
| 4,111,222 | A | 9/1978 | Hassell | |
| 4,240,464 | A * | 12/1980 | Schink | G05D 16/0669 137/116.5 |
| 4,696,320 | A * | 9/1987 | Bull | G05D 16/0661 137/116.5 |
| 4,942,899 | A * | 7/1990 | Vork | G05D 16/0655 137/454.5 |
| 5,141,022 | A * | 8/1992 | Black | G05D 16/0655 137/495 |
| 5,184,739 | A ‡ | 2/1993 | Kusz | A61J 7/04 116/308 |
| 6,112,619 | A ‡ | 9/2000 | Campbell | F16K 31/60 116/277 |
| 6,691,735 | B1 ‡ | 2/2004 | Harneit | F16K 37/0008 137/505 |
| 7,992,527 | B2 ‡ | 8/2011 | Merwin | F22B 37/46 |
| 8,375,991 | B2 ‡ | 2/2013 | Erhardt | F16K 11/0873 137/625.47 |
| 8,707,986 | B2 | 4/2014 | Santos et al. | |
| 9,618,127 | B1 ‡ | 4/2017 | Colpan | F16K 5/10 |
| 9,709,189 | B2 ‡ | 7/2017 | Matalon | F16K 35/027 |
| 2005/0139268 | A1 ‡ | 6/2005 | Kremer | F16K 1/302 137/553 |
| 2006/0102236 | A1 ‡ | 5/2006 | Phillips | F16K 37/0008 137/557 |
| 2008/0173666 | A1 ‡ | 7/2008 | Coe | B65D 83/0409 221/265 |
| 2009/0314360 | A1 ‡ | 12/2009 | Checiches | G05D 16/10 137/505 |
| 2016/0120756 | A1 ‡ | 5/2016 | Nazginov | A61J 7/04 116/201 |

OTHER PUBLICATIONS

Caleffi North America, Inc., AutoFill pre-adjustable filling units & backflow preventer 553-573 series, Product Specification Catalog, 2012, 4 pages, Milwaukee, WI, U.S.A.‡

\* cited by examiner
‡ imported from a related application

BOILER FILL VALVE WITH REGULATED FAST-FILL

CROSS-REFERENCE TO RELATED APPLICATION

This application is a continuation-in-part of and claims priority to U.S. patent application Ser. No. 15/401,997, filed Jan. 9, 2017, which claims the benefit of U.S. Provisional Patent Application No. 62/276,357, filed Jan. 8, 2016, each of which is incorporated herein by reference.

BACKGROUND

1. Field

The subject disclosure relates to pressure regulator valves with a regulated fast-fill feature.

2. Background of the Related Art

Residential and commercial hydronic heating systems have used boilers for a number of years. The heating systems generally operate by heating boiler water to produce steam, which is then distributed through a piping system to distribute heat to the facility. Once distributed, the resultant steam condenses as water and returns to the boiler to be heated again and redistributed. Because of loss and the cycling boiler operation, it is desirable to maintain a consistent water pressure in the system at all times. A typical desirable heating system water pressure is 15 psi in a residential setting. However, typical town water supply pressure is 50 psi. Thus, a pressure regulator is typically installed between the boiler and town water supply to regulate down the pressure to the desired level.

Upon installation, the boiler intakes a large amount of water. Ideally, the initial fill will take place at an elevated pressure in order to quickly supply the desired amount of water and facilitate purging air from the heating system. To accomplish this quick fill and subsequent pressure regulation, Watts Water Technologies, Inc. of North Andover, Mass. has developed a feed water pressure regulator with a fast-fill/purge lever (Watts Pressure Regulator Model No. 1156F available from Watts Water Technologies, Inc. of North Andover, Mass. or at www.watts.com). The 1156F regulator has a lever that can be moved to an open position that allows maximum flow. In the open position, there is no regulating of the flow. Once the boiler is filled, the lever is simply moved to the normal operation position in which the 1156F regulator maintains normal system pressure. The normal system pressure is often set by review of the boiler pressure gauge that indicates the pressure setting. The 1156F regulator is set so that the operator can make an adjustment while reviewing the pressure setting of the boiler pressure gauge.

SUMMARY

The present disclosure is directed to a pressure regulator assembly with a fast-fill feature to enable efficient filling and purging of the hydronic system. The fast-fill feature is useful when filling the system during new construction, refilling after maintenance has drained some or all of the system, sustained flow for air purging, and the like.

The fast-fill feature works by over-riding the normal setpoint (preferably adjustable between approximately 5 PSI to 23 PSI) and sets the valve to a fixed downstream pressure value (preferably 25 PSI). In this way, maximum flow is available to both fill the system rapidly and maximize air purging when the operator cycles the high point vents. The pressure regulator assembly still remains functional as a regulator during fast-fill mode, ensuring that the system over-pressure relief valve will not be opened should upstream pressure rise over the boiler relief setpoint (traditionally set at approximately 30 PSI) or should the operator forget to return the valve to normal operation at the conclusion of the filling and venting operation. In one embodiment, the fast-fill mode may be enabled by rotating a lever. To return from fast-fill to normal operation, the operator manually returns the lever to the normal position.

One embodiment of the subject technology is directed to a pressure regulator assembly having a normal mode and a regulated fast-fill mode including a spring cage and a body coupled to the spring cage. Together, the spring cage and body form a housing assembly that defines an inlet in fluid communication with an outlet as well as an interior between the inlet and the outlet. A seat/diaphragm assembly mounts in the interior for selectively closing a flowpath between the inlet and the outlet. A preload spring mounts in the interior to apply a force on the seat/diaphragm assembly so that in the normal mode, the flowpath is closed if a downstream pressure is above a first pressure setting. An actuation assembly includes a lever rotatably coupled to the spring cage and a push rod slidably mounted so that in the regulated fast-fill mode, the lever is moved so that the push rod further compresses the preload spring to open the flowpath and regulate flow therethrough if the downstream pressure is below a second pressure setting. Preferably, in the normal mode, regulated flow through the flowpath occurs if the downstream pressure is below the first pressure setting. The first pressure setting is lower than the second pressure setting. A spring washer assembly can mount to the spring cage for compressing the preload spring in the normal mode.

Another embodiment of the subject technology is directed to a pressure regulator assembly having a normal mode and a regulated fast-fill mode. The pressure regulator assembly includes a spring cage and a body coupled to the spring cage. The body defines an inlet in fluid communication with an outlet, wherein the spring cage and the body define an interior. A spring washer assembly mounts to the spring cage. A push rod slidably mounts in the screw/spring washer assembly. A seat/diaphragm assembly mounts in the interior for selectively closing a flowpath between the inlet and the outlet. A lever rotatably couples to the spring cage with a preload spring extending between the screw/spring washer assembly and the seat/diaphragm assembly. When the lever is in a normal mode position, compression of the preload spring between the spring washer assembly and the seat/diaphragm assembly produces a first force upon the seat/diaphragm assembly to; selectively close the flowpath if a downstream pressure is above a first pressure setting; and allow regulated through the flowpath if the downstream pressure is below a first pressure setting. When the lever is in a fast-fill mode position, the preload spring is further compressed by movement of the lever to produce a second force upon the seat/diaphragm assembly to selectively open the flowpath for regulated flow if a downstream pressure is below a second pressure setting, the first pressure setting being lower than the second pressure setting. The pressure regulator may also include an adjustment screw coupled to the spring cage for setting the compression of the preload spring in the normal mode position as well as a spring button for coupling the push rod movement to the preload spring. Preferably, the spring washer assembly includes a feature, such as a depending flange, for retaining the spring button axially aligned during movement.

Still another embodiment of the subject technology is directed to a pressure regulator assembly including a spring cage housing assembly defining an inlet in fluid communication with an outlet. A diaphragm assembly mounts in the spring cage housing for selectively closing a flowpath between the inlet and the outlet. Actuation means selectively act upon a preload spring extending between the actuation means and the diaphragm assembly. When the actuation means are in a normal mode position, the preload spring produces a first force upon the diaphragm assembly to: selectively close the flowpath if a downstream pressure is above a first pressure setting; and allow regulated through the flowpath if the downstream pressure is below a first pressure setting. When the actuation means is in a fast-fill mode position, the preload spring is further compressed between the actuation means and the diaphragm assembly to produce a second force upon the diaphragm assembly to selectively open the flowpath for regulated flow if a downstream pressure is below a second pressure setting, the first pressure setting being lower than the second pressure setting. In one embodiment, the actuation means is a screw/spring washer assembly mounted to the spring cage, a push rod slidably mounted in the screw/spring washer assembly, and a lever rotatably coupled to the spring cage. The first force may be produced by compression of the preload spring between the spring cage housing assembly and the diaphragm assembly.

It should be appreciated that the subject technology can be implemented and utilized in numerous ways, including without limitation as a process, an apparatus, a system, a device, a manufacturing process, and a method for applications now known and later developed. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the following drawings.

DETAILED DESCRIPTION OF PREFERRED EMBODIMENTS

Figure 1:
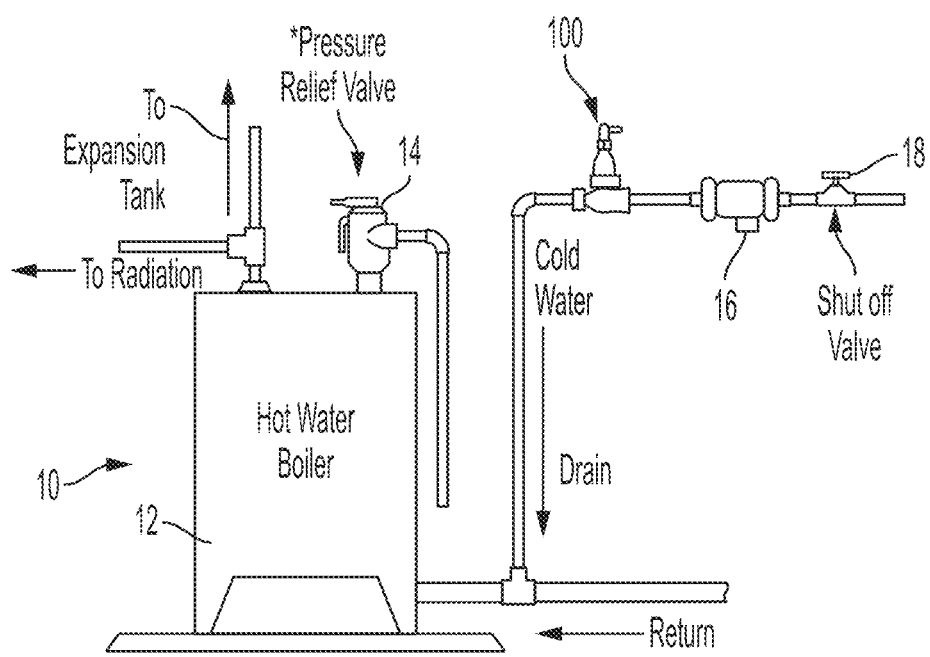
FIG. 1 is a schematic diagram of a heating system in accordance with the subject disclosure.

The subject technology improves upon feed water pressure regulators by providing an easier to operate fast-fill setting with a pressure regulating feature at the higher pressure fast-fill setting. The advantages, and other features of the subject technology disclosed herein, will become more readily apparent to those having ordinary skill in the art from the following detailed description of certain preferred embodiments taken in conjunction with the drawings which set forth representative embodiments of the subject technology and wherein like reference numerals identify similar structural elements. Directional indications such as upward, downward, right, left and the like are used with respect to the figures and not meant in a limiting manner.

Referring now to the FIG. 1, there is shown a schematic diagram of a heating system 10 in accordance with the subject disclosure. The schematic diagram of FIG. 1 includes illustrative information but it is to be appreciated that various common features are omitted for clarity. The heating system 10 includes a pressure regulator assembly 100 between the cold water supply and the hot water boiler 12. The heating system 10 also has other typical components such as a pressure relief valve 14, a backflow preventer 16 and a shut-off valve 18. During normal operation, the pressure regulator assembly 100 reduces the cold water supply to a desired level for use in the heating system 10. The desired level is user-selected with 15 psi being common for residential applications. At various times such as upon initial filling of the hot water boiler 12, the pressure regulator assembly 100 is set in fast-fill mode to quickly fill the boiler 12 at an elevated pressure. The pressure regulator assembly 100 may be manually operated to switch between normal mode and fast-fill mode as described below. Typically, the water is supplied from a public source at about 50 psi whereas the pressure regulator assembly 100 provides water at a pressure of about 25 psi for initial filling of the hot water boiler 12.

Figure 2:
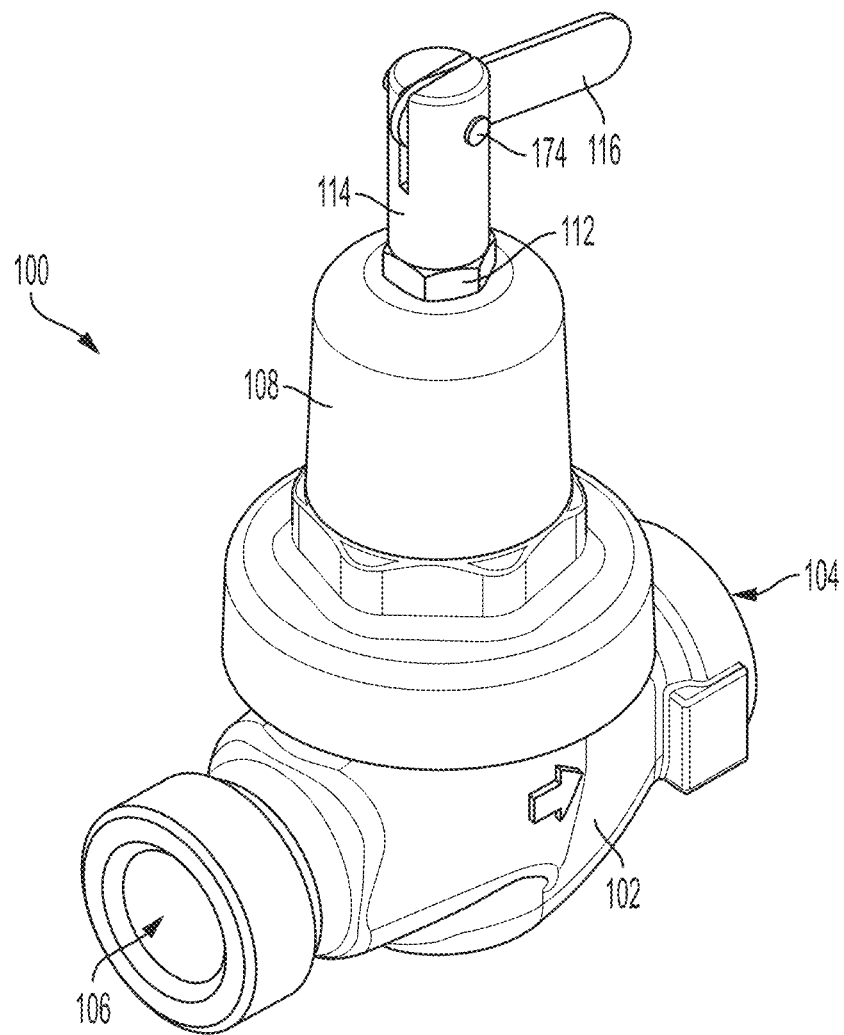
FIG. 2 is a perspective view of a pressure regulator in normal mode in accordance with the subject disclosure.
Figure 3:
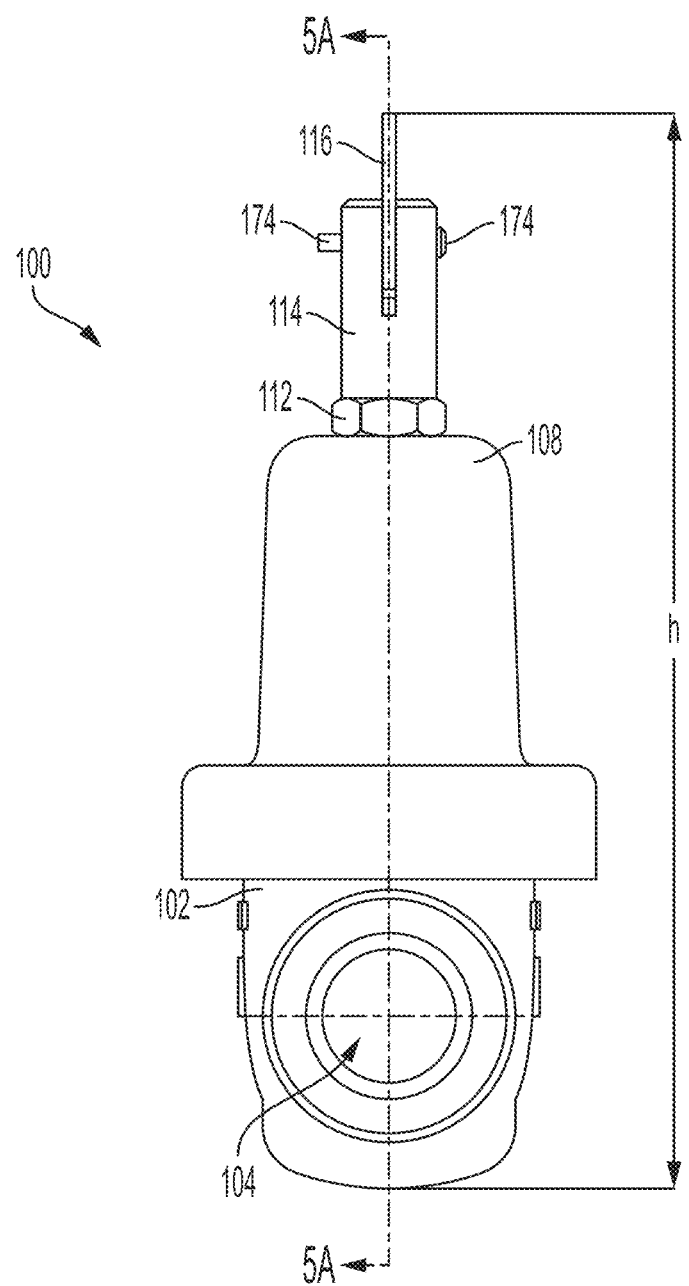
FIG. 3 is a side view of the pressure regulator of FIG. 2 in normal mode.
Figure 4:
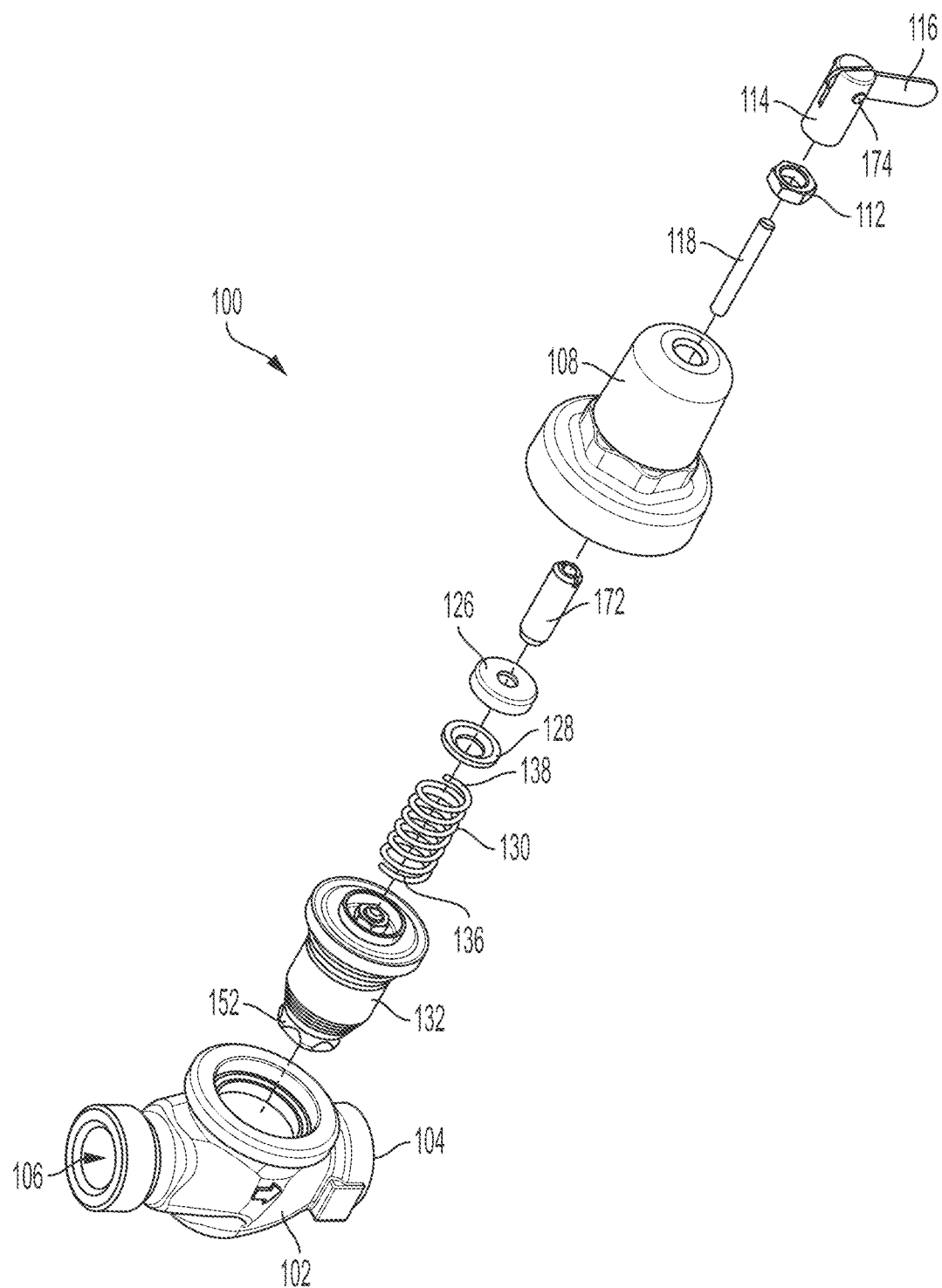
FIG. 4 is an exploded perspective view of a pressure regulator in accordance with the subject disclosure.

Referring now to FIGS. 2 and 3, perspective and side views of the pressure regulator assembly 100 in normal mode are shown. The pressure regulator assembly 100 includes a body 102 for coupling into the heating system 10. The body 102 forms an outlet 104 and an inlet 106. A spring cage 108 mounts on the body 102 so that the body 102 and spring cage 108 form an interior 110 (see FIG. 5). The spring cage 108 may include an area for a label and/or other instructional information. A locking nut 112 and cam mount assembly 114 are fixed onto the spring cage 108. A cam actuator (i.e., cam lever) 116 rotatably couples into the cam mount assembly 114 on a pin 174. In one embodiment, a height h of the pressure regulator assembly 100 is approximately 5.58 inches. A user can adjust the pressure regulator assembly 100 to provide a desired output in normal load, typically water at about 15 psi. The user may manually move the lever 116 upward to switch from normal mode into fast-fill mode so that an increased pressure can be used to quickly fill a boiler. Fast-fill mode is useful upon initial installation, during set up, for maintenance of the hot water boiler 12 and the like. Advantageously, once the hot water boiler 12 is filled, the pressure regulator assembly 100 can easily set back into normal mode by manually moving the lever 102 downward. The user can also manually adjust the pressure setting in normal mode. Operation of the pressure regulator assembly 100 is described in more detail below.

Referring now to FIGS. 4 and 5A-C, exploded and cross-sectional views of the pressure regulator assembly 100 are shown. The pressure regulator assembly 100 includes a push rod 118 slideably mounted in an adjustment screw 172 that is coupled to the spring cage 108. When the cam lever 116 is rotated upwards, a distal rounded cam surface 120 of the cam lever 116 pushes against a proximal end 122 of the push rod 118. As a result, a distal end 124 of the push rod 118 is pushed deeper into the interior 110. The adjustment locking nut 112 couples to the adjustment screw 172 for fixing the adjustment screw 172 in place but the push rod 118 can slide axially in the adjustment screw 172.

Figure 5A:
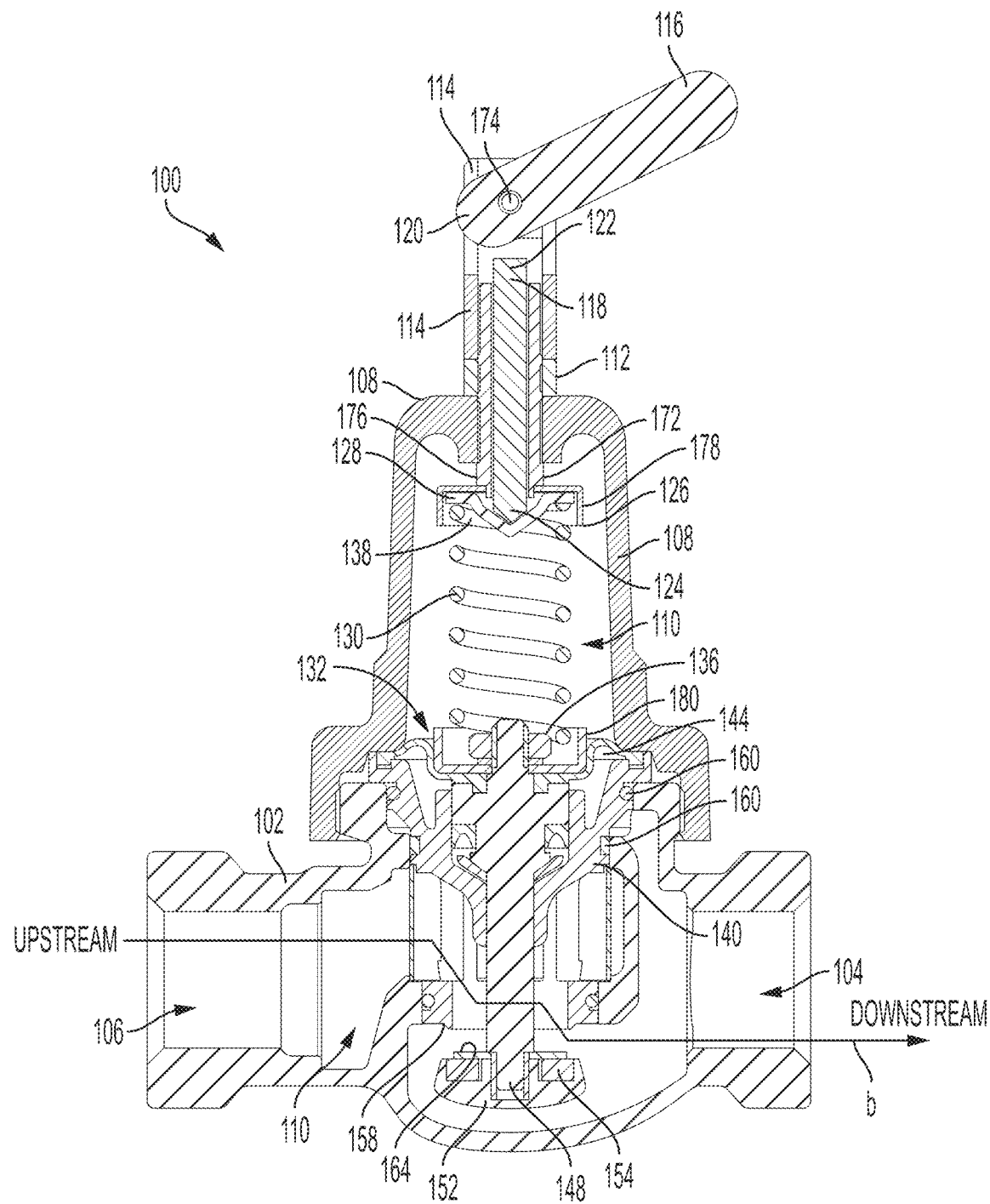
FIG. 5A is a cross-sectional view of a pressure regulator in normal mode with flow taken along line 5A-5A of FIG. 3 in accordance with the subject disclosure.

An upper spring washer 126 couples to a distal end 176 of the adjustment screw 172. The upper spring washer 126 acts on the preload spring 130 to set compression of the preload spring 130 in the normal mode (FIG. 5A). A spring button 128 nestles within the upper spring washer 126 and couples to the distal end 124 of the push rod 118. With nothing but gravity acting on the push rod 118, the preload spring 130 pushes the spring button 128 upward against the upper spring washer 126. In fast-fill mode (FIG. 5C), movement of the push rod 118 by the cam lever 116 pushes the floating spring button 128 downward to increase compression of the preload spring 130.

In the interior 110, the preload spring 130 extends between the spring button 128 and a seat and diaphragm assembly 132. The upper spring washer 126 has a depending flange 178 that surrounds the spring button 128 and the upper or proximal end 138 of the preload spring 130 for axial alignment. The seat and diaphragm assembly 132 is fixed in the interior 110 for selectively varying the flow through the body 102. As discussed in more detail below, different force from the preload spring 130 acts upon the seat and diaphragm assembly 132 to move between the normal and fast-fill modes.

Figure 5B:
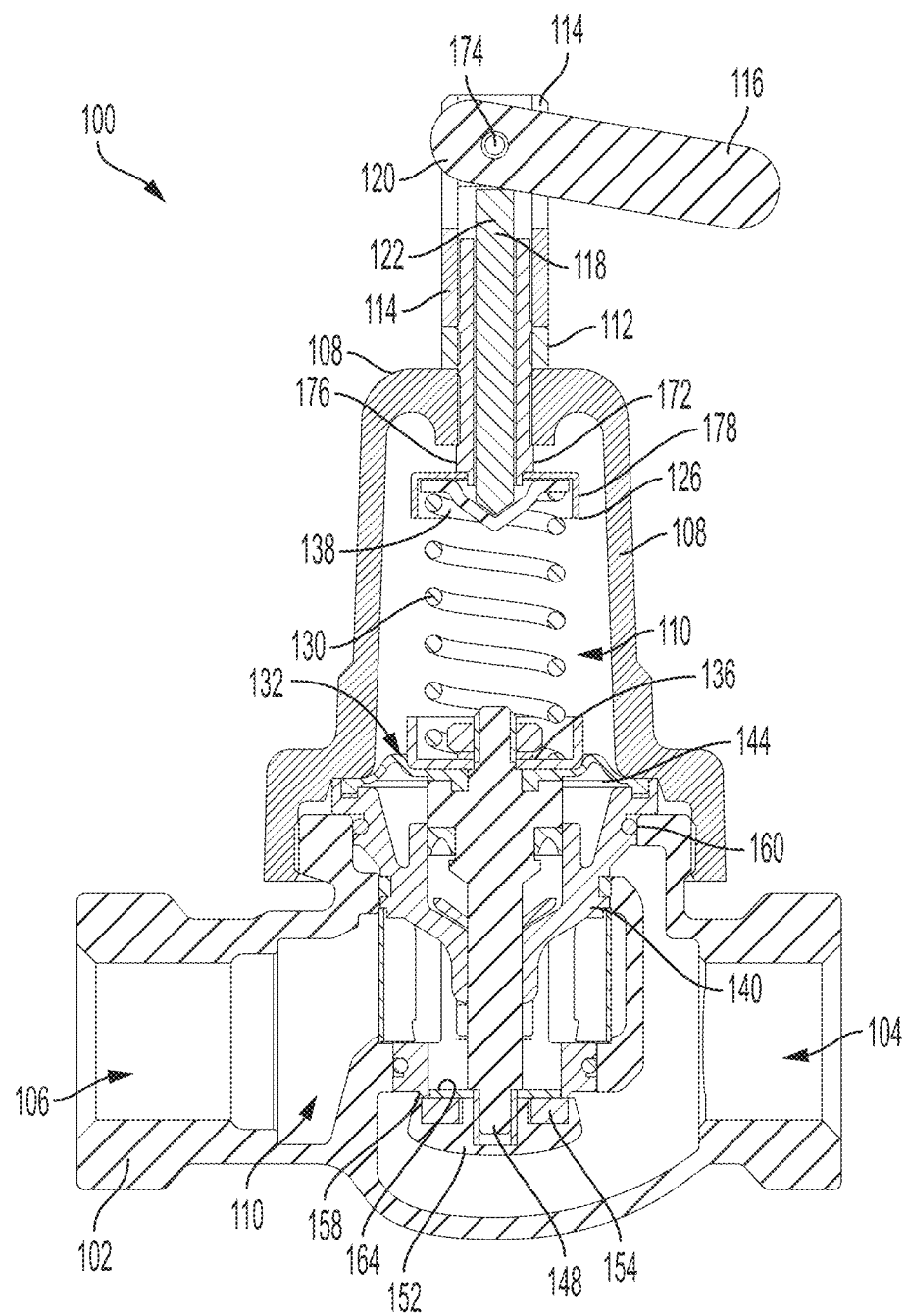
FIG. 5B is a cross-sectional view of a pressure regulator in normal mode with no flow in accordance with the subject disclosure.
Figure 6A:
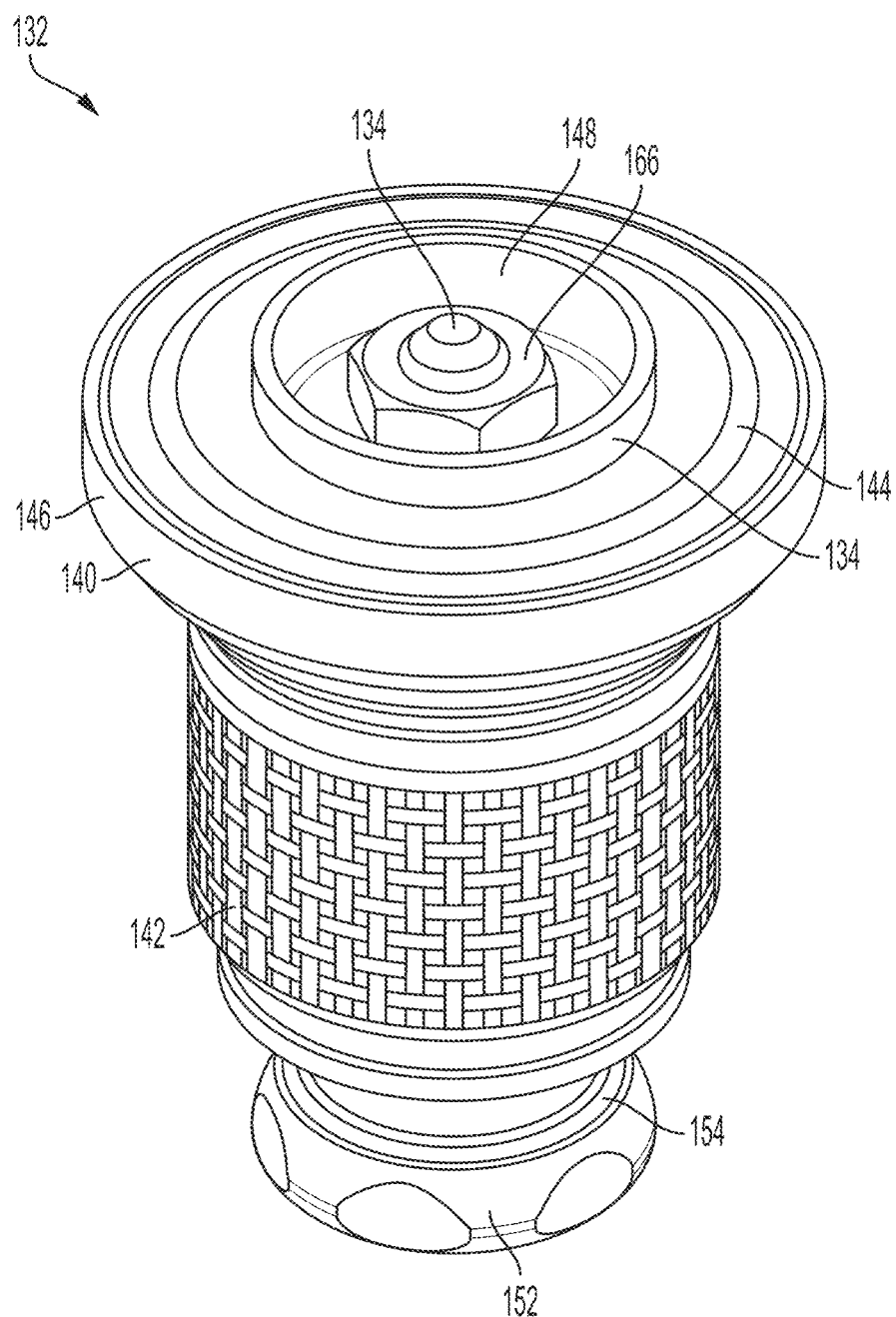
FIGS. 6A and 6B illustrate perspective and cross-sectional views, respectively, of a seat and diaphragm assembly in accordance with the subject disclosure.
Figure 6B:
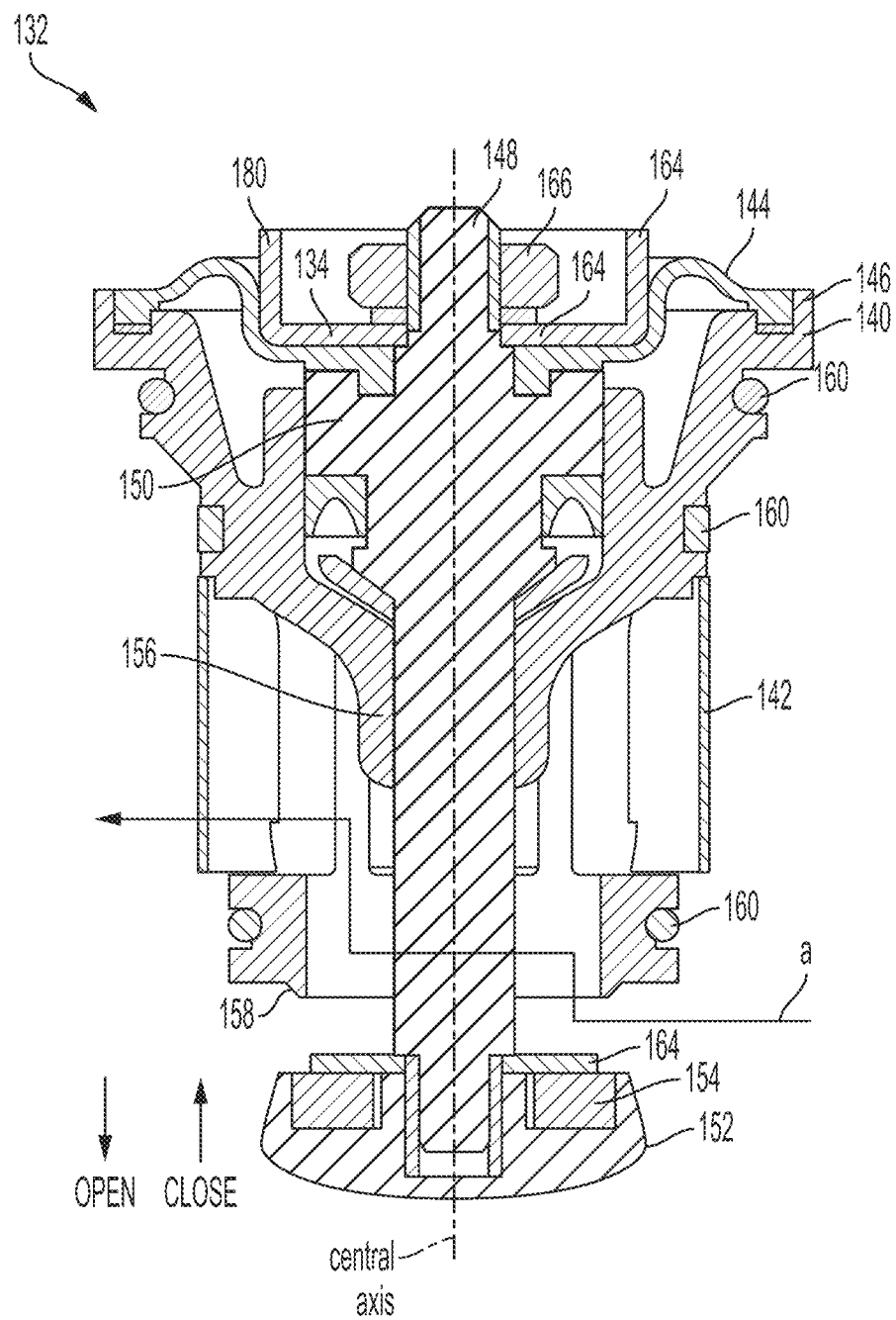

Referring now to FIGS. 6A and 6B, perspective and cross-sectional views, respectively, of the seat and diaphragm assembly 132 are shown. Preferably, the seat and diaphragm assembly 132 is a reverse-seated, direct-acting regulator. The seat and diaphragm assembly 132 utilizes downstream pressure to provide closing motive force to overcome both upstream pressure and pressure of the preload spring 130. In the normal mode, when the downstream pressure is below a preset pressure, the upstream pressure opens the seat and diaphragm assembly 132 to allow a regulated flow (FIG. 5A). When the downstream pressure rises to the preset pressure, the resulting force imbalance closes the seat and diaphragm assembly 132 to shut off flow (FIG. 5B).

The seat and diaphragm assembly 132 includes a shell 140 with a depending strainer 142 that encloses other components. A flexible diaphragm 144 partially encloses the top end 146 of the shell 140. The seat and diaphragm assembly 132 includes a lower spring washer 134 that couples to the lower or distal end 136 of the preload spring 130. The lower spring washer 134 has an upstanding flange 180 that retains the distal end 136 of the preload spring 130. The lower spring washer 134 is configured to couple into the flexible diaphragm 144 for transferring the force of the preload spring 130 thereto. A valve stem 148 extends along a central axis through the spring washer 134 and the flexible diaphragm 144. An upper shoulder 150 of the valve stem 148 couples to the diaphragm 144 so that flexing of the diaphragm 144 causes movement of the valve stem 148 along the central axis. The shell 140 has a central portion 156 that acts as a guide for movement of the valve stem 148.

A bottom seat 158 of the shell 140 forms an inlet opening for a flowpath as shown by arrow a. The valve stem 148 terminates in a disc holder 152 that retains a disc 154. The disc 154 and the bottom seat 158 interact to selectively close the flowpath. Several sealing o-rings 160, a packing seals 162, washers 164 and a nut 166 seal and hold the seat and diaphragm assembly 132 in tact.

Referring again to FIGS. 5A-C, to set the regulated pressure of the pressure regulator assembly 100 in normal mode, the user removes the cam mount assembly 114 and loosens the locking nut 112 so that the adjustment screw 172 may be moved. By turning the adjustment screw 172 clockwise, the upper spring washer 126 is carried deeper into the interior 110. As a result, the force of the preload spring 130 increases and the regulated pressure setpoint is increased. Preferably, the technician checks a pressure gauge to verify the desired setting. Then, the locking nut 112 can be tightened to fix the setting. To lower the regulated pressure setpoint, the same procedure is followed but the adjustment screw 172 is turned counterclockwise to raise the push rod 118 and reduce the force of the preload spring 130.

Referring to FIG. 5A, the pressure regulator assembly 100 is shown in normal mode with some flow. The preload spring 130 extends between the spring button 128 and the lower spring washer 134 to apply the preset downward force on the flexible diaphragm 144. If the downstream pressure below the diaphragm 144 is not sufficient to overcome both the upstream pressure and the force applied by the preload spring 130, the valve stem 148 extends downward so that a flowpath (indicated by arrow b) is open. As a result, the hot water boiler 12 is fed water.

Referring to FIG. 5B, when the downstream pressure rises sufficiently, the force of the upstream pressure and the preload spring 130 is overcome. The resulting force imbalance pushes the diaphragm 144 upward. As a result, the valve stem 148 moves upward to close the pressure regulator assembly 100 by pushing the disc 154 tight against the seat 158, shutting off flow.

Figure 5C:
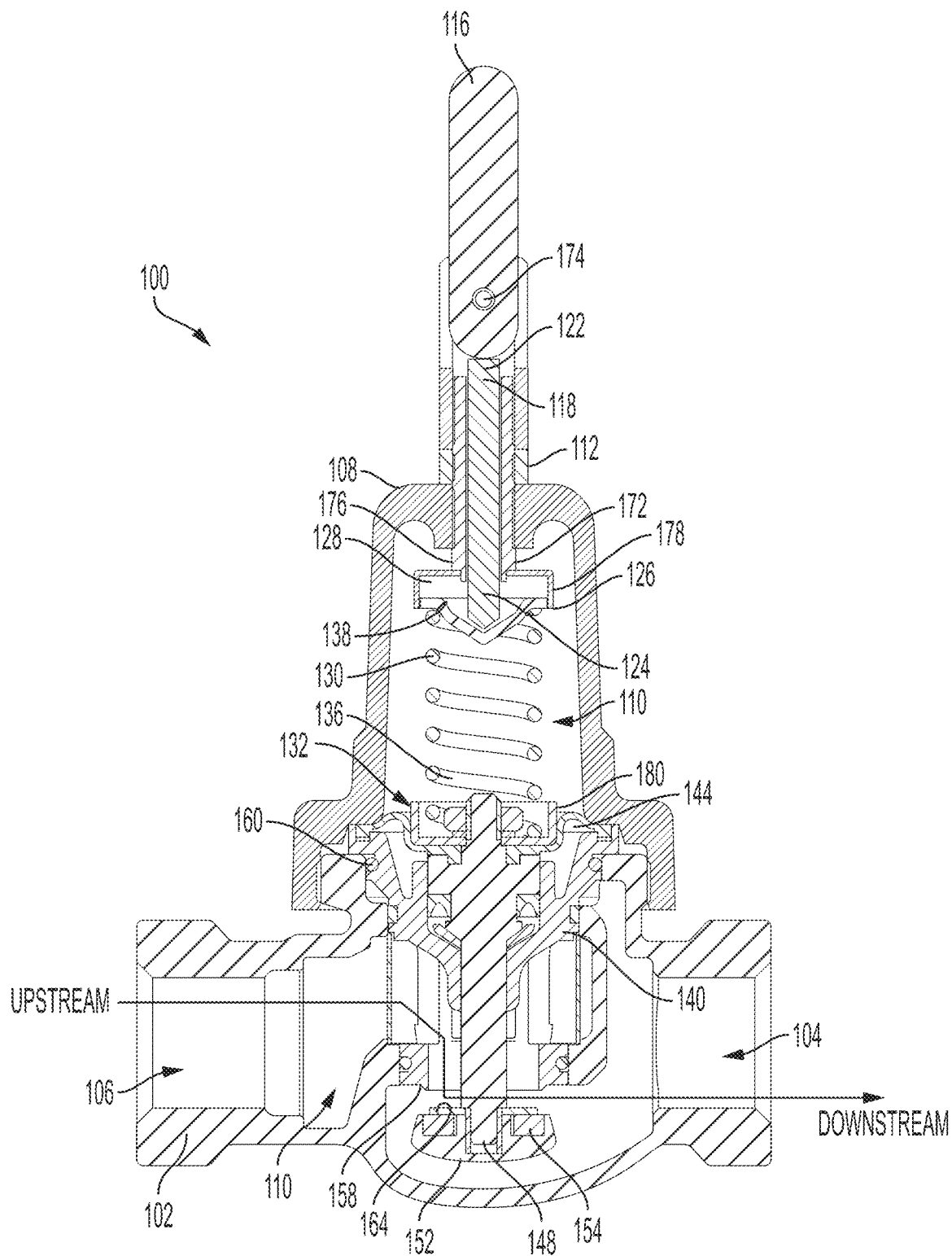
FIG. 5C is a cross-sectional view of a pressure regulator in fast-fill mode in accordance with the subject disclosure.

Referring to FIG. 5C, the cam lever 116 has been rotated upward so that the push rod 118 is forced to slide downward. The distal end 124 of the push rod 118 drives the spring button 128 downward to increase compression of the preload spring 130. As a result, more force is applied to the lower spring washer 134 and flexible diaphragm 144. The selection of the preload spring 130 and arrangement of the components is such that the valve stem 148 goes to a high or maximum setting (e.g., maximum output pressure) for fast-fill of the boiler. In one embodiment, the maximum output pressure setting is approximately 23 psi.

Of note, the pressure regulator assembly 100 still remains functional as a regulator during this fast-fill mode because the preload spring 130 provides the force that opens the pressure regulator assembly 100. In other words, the downstream pressure may increase to create an imbalance such that the force of the preload spring 130 is overcome to close or partially close the pressure regulator assembly 100. Regulation during the fast-fill mode ensures that the system over-pressure relief valve 14 will not be opened should upstream pressure rise over the boiler relief setpoint (traditionally set at approximately 30 PSI). For example, if the operator forgets to return the pressure regulator assembly 100 to normal mode at the conclusion of the filling and venting in fast-fill mode, the pressure regulator assembly 100 will still provide regulated flow.

If the fast-fill mode is no longer needed, the pressure regulator assembly 100 may have the fast-fill mode disabled to avoid accidental activation by the homeowner or other inadvertent actuation of the cam lever 116. To disable, the mount assembly 114 is removed to allow access to the push rod 118. Removal of the push rod 118 disables the fast-fill mode. Alternatively, the cam lever 116 could also be removed by releasing the pin 174 from the mount assembly 114.

In one embodiment, the maximum output pressure setting in fast-fill mode may be selectively adjusted. For example, the mount assembly 114 may thread onto the adjustment screw 172 a variable amount. The mount assembly 114 may be fixed in place with a set screw or the like. As such, the depth to which the cam lever 116 moves down the push rod 118 varies to vary the compression of the preload spring 130 and, in turn, the setting of the fast-fill regulated pressure. In another embodiment, the pin 174 may selectively mount in different holes in the mount assembly 114 so that the cam lever 116 moves the push rod 118 different depths. The subject technology is also applicable to any type of system. For example, the subject technology would work equally as well in a steam type system, a hydronic type system and the like.

Figure 7A:
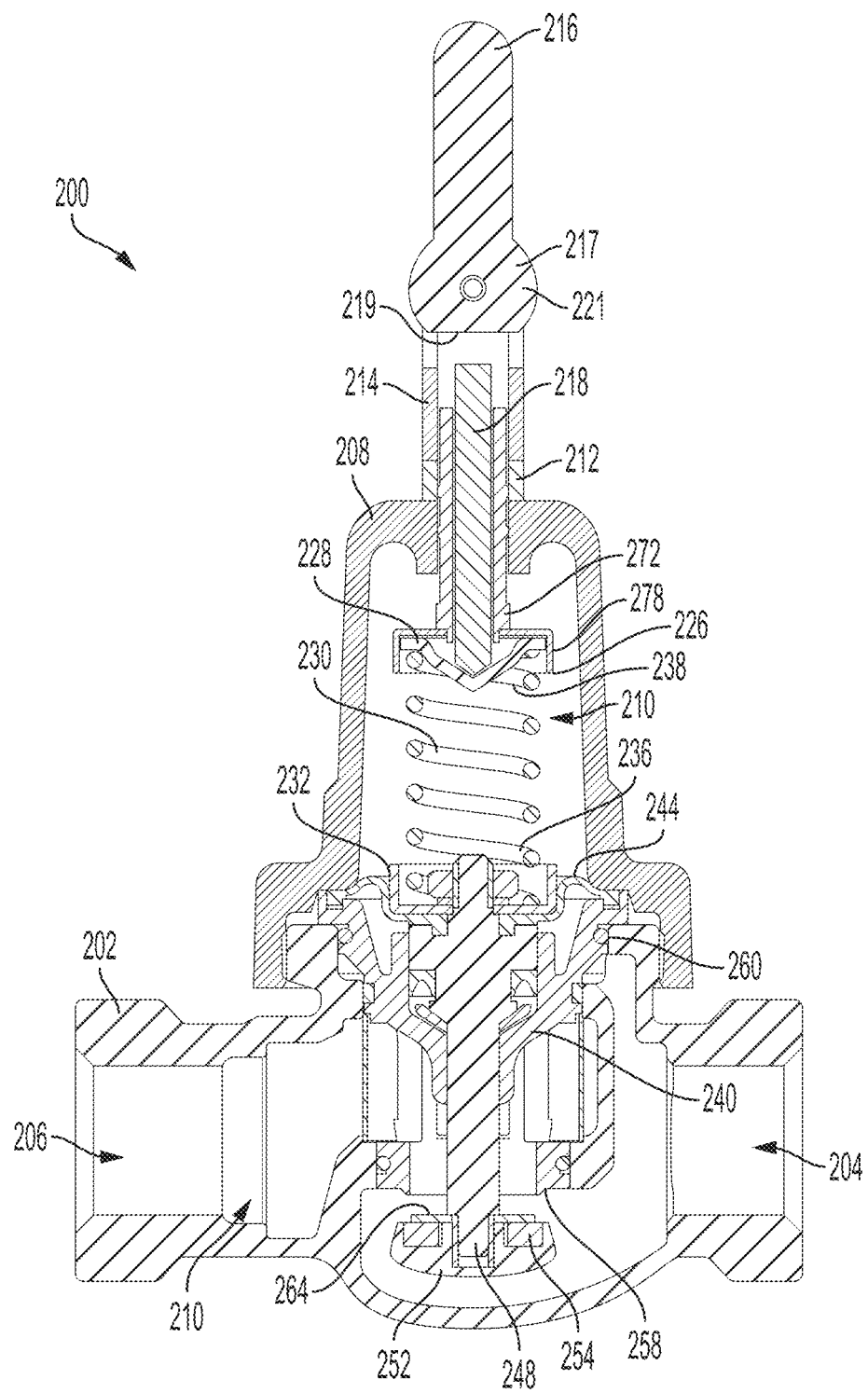
FIG. 7A is a cross-sectional view of a reverse acting pressure regulator in normal mode with a reduced pressure setting in accordance with the subject disclosure.
Figure 7B:
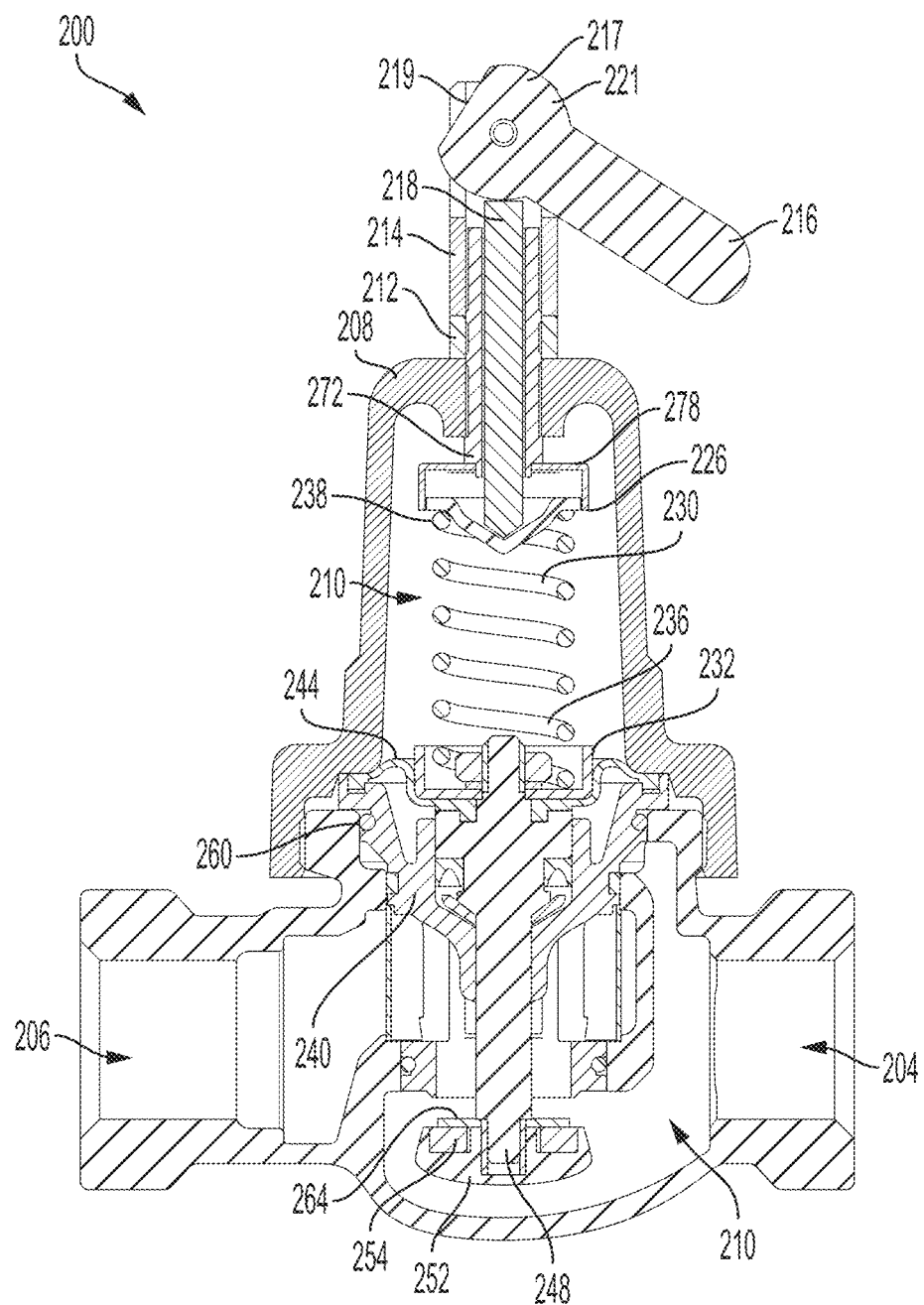
FIG. 7B is a cross-sectional view of the reverse acting pressure regulator of FIG. 7A in fast-fill mode in accordance with the subject disclosure.

Referring now to FIGS. 7A and 7B, cross-sectional view of a reverse acting pressure regulator assembly 200 are shown. As will be appreciated by those of ordinary skill in the pertinent art, the pressure regulator assembly 200 utilizes similar principles to the pressure regulator assembly 100 described above. Accordingly, like reference numerals preceded by the numeral "2" instead of the numeral "1", are used to indicate like elements. The primary difference of the pressure regulator assembly 200 is that the lever 216 is shaped differently to reverse the operation. The following description is directed to the differences.

The lever 216 has a lower portion 217 that is largely circular with a flat end 219. As can be seen in FIG. 7A, when the lever 216 is upward, the flat end 219 creates ample space for the push rod 218 to freely move upward if the pressure dictates closing flow. Alternatively in FIG. 7B, when the lever 216 is moved downward, a circular portion 221 engages and forces the push rod 218 downward to open the flow for high pressure filling operation. As noted above, even during high pressure operation, the pressure regulator assembly 200 still regulates the flow.

It is envisioned that the pressure regulator assemblies 100, 200 can be adapted to various applications. For example, a pressure regulator assembly may be configured to override the normal operation when a fire suppression system is in operation. Such a pressure regulator assembly may be set to an alternative pressure for the fire suppression system operation rather than a preferred setting for filling a new boiler. In another example, a pressure regulator assembly can reduce the water pressure that is available such as when the structure may be unoccupied for an extended period.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., threads, bodies, cages, rods, washers, cam surfaces, banking surfaces and the like) shown as distinct for purposes of illustration may be incorporated within other functional elements in a particular implementation. A variety of materials are suitable to construct the subject technology such as bronze, brass, stainless steel, polytetrafluoroethylene (PTFE) tubing, zinc plated steel, die cast aluminum, glass filled noryl and the like.

While the subject technology has been described with respect to preferred embodiments, those skilled in the art will readily appreciate that various changes and/or modifications can be made to the subject technology without departing from the spirit or scope of the subject technology.

The invention claimed is:

1. A pressure regulator assembly having a regulated normal mode and a regulated fast-fill mode comprising:
   a spring cage;
   a body coupled to the spring cage and defining an inlet for ingress of a liquid and in fluid communication with an outlet for egress of a liquid, wherein the spring cage and the body define an interior;
   a seat assembly movably mounted in the interior for selectively closing a flowpath between the inlet and the outlet;
   a preload spring mounted in the interior having a distal end to apply a force on the seat assembly so that in the normal mode, the flowpath is normally open but regulated and selectively closed at a first predefined liquid pressure at the outlet;
   a spring washer assembly configured to capture a proximal end of the preload spring; and
   an actuation assembly including: a cam actuator lever configured to not engage the preload spring in the normal mode; and a push rod slidably mounted and extending between the lever and the spring washer assembly, wherein the cam actuator lever is rotatably mounted so that a distal cam surface, in the regulated fast-fill mode position, forces the push rod against the spring washer assembly to further compress the preload spring to selectively open the flowpath at a second predefined pressure at the outlet and regulate flow therethrough based upon downstream liquid pressure at the outlet.

2. The pressure regulator assembly of claim 1, wherein in the normal mode, regulated flow through the flowpath occurs if the downstream pressure is below a normal mode pressure setting.

3. The pressure regulator assembly of claim 2, wherein the normal mode pressure setting is lower than the fast-fill mode pressure setting.

4. The pressure regulator assembly of claim 1, wherein the spring washer assembly is mounted to the spring cage for compressing the preload spring in the normal mode.

5. The pressure regulator assembly of claim 1, wherein the spring washer assembly includes a spring button configured to couple the push rod movement to the preload spring.

6. A pressure regulator assembly having a normal mode and a regulated fast-fill mode comprising:
   a spring cage;
   a body coupled to the spring cage and defining an inlet in fluid communication with an outlet, wherein the spring cage and the body define an interior;
   a spring washer assembly mounted to the spring cage;
   a push rod slidably mounted in the spring washer assembly;
   a seat assembly mounted in the interior for selectively closing a flowpath between the inlet and the outlet;
   a lever rotatably coupled to the spring cage between a normal mode position and a regulated fast-fill mode position; and
   a preload spring extending between the spring washer assembly and the seat assembly;

wherein:
when the lever is in the normal mode position, the lever does not engage the preload spring, and compression of the preload spring between the spring washer assembly and the seat assembly produces a first force upon the seat assembly to: selectively close the flowpath if a downstream pressure is above a first pressure setting; and allow regulated through the flowpath if the downstream pressure is below a first pressure setting; and when the lever is in the fast-fill mode position, the lever engages the preload spring so that the preload spring is further compressed by the circular portion to produce a second force upon the seat assembly to selectively open the flowpath for regulated flow if a downstream pressure is below a second pressure setting, the first pressure setting being lower than the second pressure setting.

7. The pressure regulator assembly of claim 6, further comprising: an adjustment screw coupled to the spring cage for setting the compression of the preload spring in the normal mode position; and a spring button for coupling the push rod movement to the preload spring.

8. The pressure regulator assembly of claim 7, wherein the spring washer assembly includes a depending flange for retaining the spring button axially aligned during movement.

9. A pressure regulator assembly comprising:
a spring cage housing assembly defining an inlet in fluid communication with an outlet;
a diaphragm assembly mounted in the spring cage housing assembly for selectively closing a flowpath between the inlet and the outlet;
actuation means including a washer assembly mounted in the spring cage housing assembly, a push rod slidably mounted to the washer assembly, and a lever rotatably coupled to the spring cage housing assembly for selectively pushing the push rod; and
a preload spring extending between the actuation means and the diaphragm assembly;
wherein:
when the actuation means are in a normal mode position, the preload spring produces a first force upon the diaphragm assembly to: selectively close the flowpath if a downstream pressure is above a first pressure setting; and allow regulated through the flowpath if the downstream pressure is below a first pressure setting, wherein the first force is produced by compression of the preload spring between the spring cage housing assembly and the diaphragm assembly; and when the actuation means is in a fast-fill mode position, the lever pushes the push rod so that the preload spring is further compressed between the washer assembly and the diaphragm assembly to produce a second force upon the diaphragm assembly to selectively open the flowpath for regulated flow if the downstream pressure is below a second pressure setting, the first pressure setting being lower than the second pressure setting.

10. The pressure regulator assembly of claim 9, wherein the second force is adjusted by adjustment of the means for actuation to selectively adjust the second pressure setting.

11. The pressure regulator assembly of claim 9, wherein the spring cage housing assembly includes an adjustment screw, wherein the push rod slideably mounts in the adjustment screw so that, in the normal mode position, the push rod is spaced from the lever but in the fast-fill mode position, the lever is actuated so that the lever pushes against the push rod and, thereby, pushes the washer assembly to increase compression of the preload spring.

12. The pressure regulator assembly of claim 11, further comprising an adjustment locking nut coupled to the adjustment screw for selectively fixing the adjustment screw.

* * * * *

UNITED STATES PATENT AND TRADEMARK OFFICE
CERTIFICATE OF CORRECTION

PATENT NO. : 11,054,129 B2  
APPLICATION NO. : 16/238166  
DATED : July 6, 2021  
INVENTOR(S) : Doughty et al.

Page 1 of 1

It is certified that error appears in the above-identified patent and that said Letters Patent is hereby corrected as shown below:

On the Title Page

Item (73), correct the listed Assignee: to "Watts Regulator Co.".

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*